(12) United States Patent
Johnson

(10) Patent No.: US 9,175,724 B2
(45) Date of Patent: Nov. 3, 2015

(54) LINEAR GUIDE DEVICE

(75) Inventor: Ahren K Johnson, North Bend, WA (US)

(73) Assignee: CNC Router Parts LLC, North Bend, WA (US)

( * ) Notice: Subject to any disclaimer, the term of this patent is extended or adjusted under 35 U.S.C. 154(b) by 991 days.

(21) Appl. No.: 13/289,464

(22) Filed: Nov. 4, 2011

(65) Prior Publication Data

US 2013/0112826 A1    May 9, 2013

(51) Int. Cl.
*F16C 29/00* (2006.01)

(52) U.S. Cl.
CPC ................... *F16C 29/005* (2013.01)

(58) Field of Classification Search
CPC ........ B25B 1/02; B25B 1/2468; B23P 11/027
USPC ........... 269/315, 309–310, 289 R, 302.1, 291
See application file for complete search history.

(56) References Cited

U.S. PATENT DOCUMENTS

| | | | |
|---|---|---|---|
| 6,247,690 B1 * | 6/2001 | Wolf | 269/277 |
| 6,254,077 B1 * | 7/2001 | Riley, Jr. | 269/287 |
| 7,146,705 B2 * | 12/2006 | Ahti et al. | 29/563 |
| 8,459,627 B2 * | 6/2013 | Chan et al. | 269/287 |
| 8,511,661 B2 * | 8/2013 | Huang | 269/74 |
| 2005/0056345 A1 | 3/2005 | Duginske | |
| 2006/0248998 A1 | 11/2006 | Duginske | |

FOREIGN PATENT DOCUMENTS

EP        0641623 A1     3/1995

OTHER PUBLICATIONS

CNC Router; http://en.wikipedia.org/wiki/CNC_Router.
V-track for #2 V-groove wheel sold by the inch; http://www.cadcamcadcam.com/v-trackfor2v-groovewheel.aspx.
Linear Motion Solutions; http://www.pbclinear.com/Intregal-V-Linear-Guide-Technology.
PCT Search Report from corresponding PCT application No. PCT/US2012/063156.

* cited by examiner

*Primary Examiner* — Lee D Wilson
(74) *Attorney, Agent, or Firm* — James G. Passé; Passé Intellectual Property, LLC

(57) ABSTRACT

The present invention relates to a bracket for holding metal bar at an angle for use in linear tracking technology to provide a v-bar oriented in a manner in order to track a v-wheel along its angled edge.

6 Claims, 2 Drawing Sheets

LINEAR GUIDE DEVICE

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to linear guide technology such as for a computer numerical controlled device (e.g. a CNC router). Specifically, present invention relates to CNC router guides for holding a rectangular extruded aluminum bar, or other metal stock, at an angle to use as guide tracking with a v-groove wheel for use with a linear tracking device.

2. Description of Related Art

The use of a linear tracking device, e.g. a computer controlled tracking device such as a CNC router or other CNC device as a tool for use with aluminum, steel, plastic, wood, and foam fabrication is well known. The CNC device is run by a computer and coordinates are uploaded into the computer machine controller from a separate program. These routers are generally very useful at not only carrying out precision work, but also to do repetitive work that is very precise.

The tracking of the router head is usually done by means of use of v-groove track for use with a v-groove wheel. The wheel moves along the v-track coordinated by the computer control. A v-groove rail, however, is a specially formed product just for this use, and thus relatively very expensive. Each project normally requires cutting and positioning new pieces of rail to match the project. When CNC devices are used for home or small projects, this can be a prohibitively costly expense in considering the use of the CNC device. Other devices specifically use linear tracking, such as architectural elements (sliding doors and windows), agricultural equipment, medical equipment, semiconductor equipment, woodworking tools, and the like which require linear motion tracking.

BRIEF SUMMARY OF THE INVENTION

The present invention overcomes the cost and other issues determined above by utilizing relatively inexpensive rectangular extruded aluminum or steel stock and holders of the present invention which hold the stock at an angle wherein the edge of the stock can be utilized with a v-groove wheel for use on a linear tracking device that utilizes a v-wheel groove.

Accordingly, in one embodiment of the present invention there is a bracket for use on a linear tracking device comprising:

a) one or more holes adapted to bolt the bracket to a fixed position;
b) a groove adapted to hold a length of rectangular cross section metal bar at an angle such that an edge of the bar can be utilized to act as a guide rail for a v-groove wheel on the linear tracking device; and
c) one or more devices for holding the bar from movement in the bracket.

DETAILED DESCRIPTION OF THE INVENTION

Figure 1:
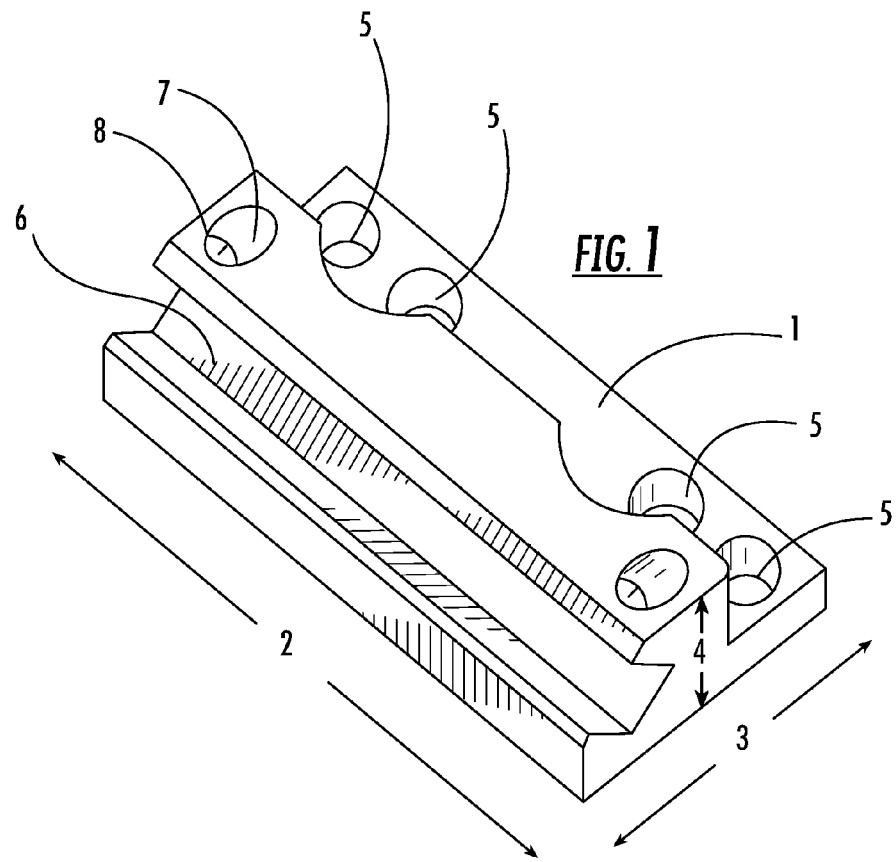
FIG. 1 is a perspective view of a bracket of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

As used herein the term "about" means±10%.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As described, a linear tracking device is a device which makes use of linear guide technology utilizing v-track in normal situations. The v-track, or anything else to be fixed for use with the device, are generally mounted on a fixed position (such as a table) that is a platform utilized by the device to control straight movement. A CNC device or other computer controlled tracking device, such as a CNC router, bolts a v-track onto a table, such as a CNC router table.

As used herein a "bracket" refers to a metal, wood, plastic, or the like device designed to hold something. In the case of the present invention, it is a bracket for use on a fixed position such as on a CNC router table that is capable of being attached to the router table for holding a rectangular rail. The bracket will have one, two, or more holes designed to be used with bolts or screws for attachment to the fixed position.

The height, width, and length of the bracket is sufficient to hold a rectangular bar in place and in view of the description herein and the figures, one could easily determine proper dimensions and number of brackets to utilize in holding a particular piece of bar.

The bracket will hold a length of rectangular cross section bar, such as extruded aluminum bar or steel bar. In one example, the dimensions of the bar rectangular cross section are from about ¼" to ½" by ½" to ½". In one embodiment ⅜" by 1". The length of the bar can be cut to the particular length desired for the particular use on the router. The bar can be extruded aluminum, steel, or other metal as desired.

On one side of the bracket there will be a groove adapted to hold the rectangular bar at an angle such that one edge is held at an angle for matching a v-wheel for running along the edge like a v-track piece of metal would be utilized. In general, then at least one edge must not be grabbed or mounted in the groove to allow access. In one embodiment, two edges of the rectangular cross section are being held. In one embodiment the bar is held at an angle of about 45 degrees off of the horizontal plane. In one embodiment, the bar is held by its shorter edge of the rectangle.

The bar is held at an angle by one or more bracket devices for holding the bar from any movement. In one embodiment, set screws are utilized to hold the bar on the bracket. This can be done by use of holes in the bracket in which screws are positioned and tightened against the bar to keep it from movement. One, two, or more set screws can be utilized. In one embodiment two or more brackets are utilized to hold each bar on the fixed position in a spaced apart position.

Now referring to the drawings. FIG. 1 is a perspective view of the present invention bracket. The bracket 1 has length 2, width 3, and height 4. The bracket 1 can be attached to a fixed position such as a CNC router table via the mounting holes 5 wherein a bolt is passed through hole 5 and a matching hole in the fixed position and bolted together. Grove 6 which runs the length 2 of bracket 1 is shaped to receive a piece of bar, such as aluminum extruded bar or steel bar, on its short edge of its rectangular profile. When so placed, the bar is held in place via screws 7 inserted in screw holes 8.

Figure 2:
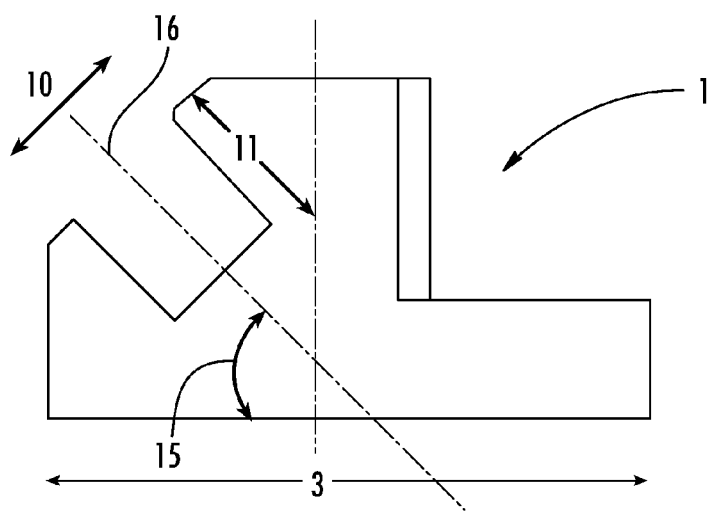
FIG. 2 is an end view of a bracket of the present invention.

In FIG. 2 the end view of the bracket 1 is shown. Herein, groove 6 is seen by an end view which has width 10 and depth 11 adapted to hold a portion of a bar. The angle of the groove 6 is determined by the angle 15 measured between the center of the groove 16 and the width 3.

Figure 3:
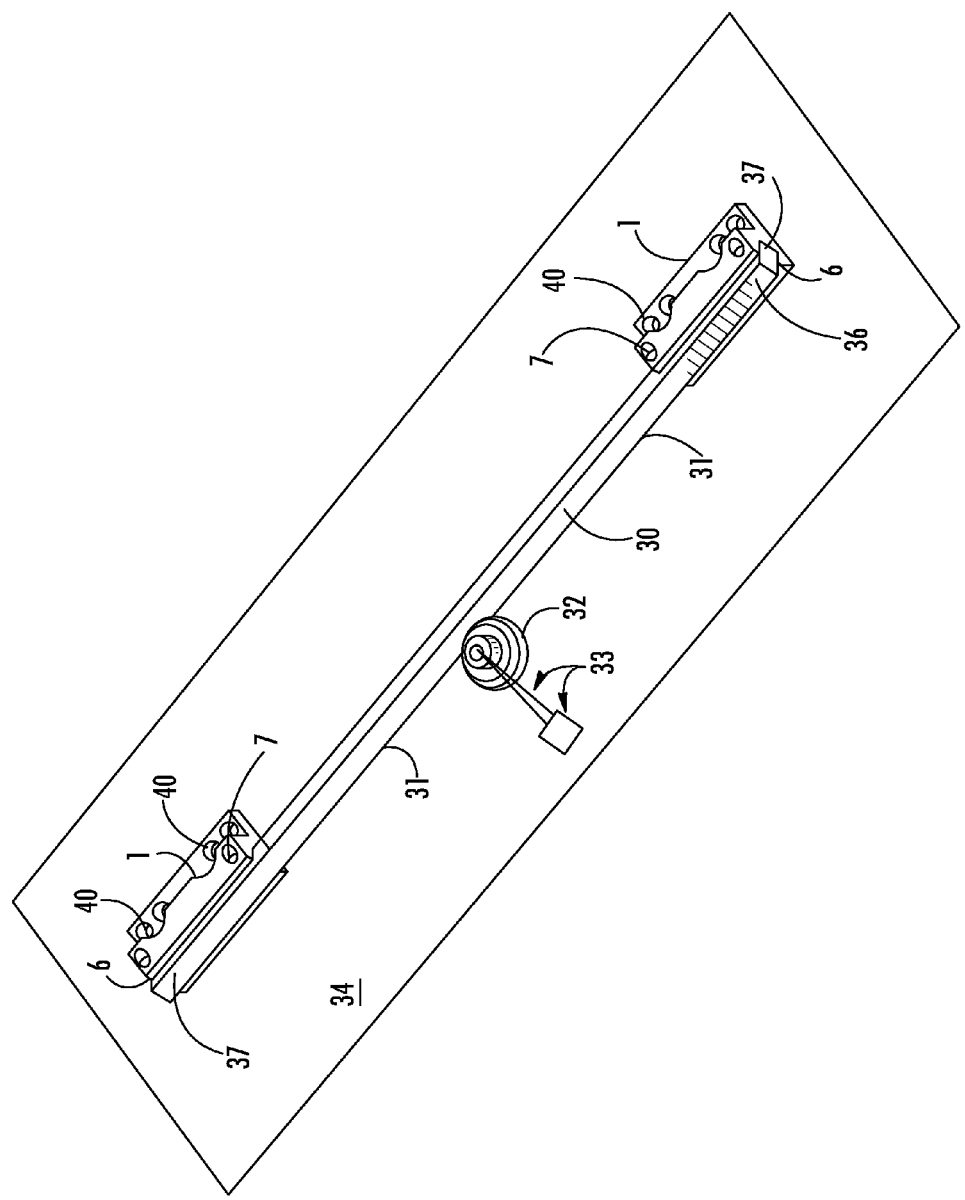
FIG. 3 is a pair of brackets of the present invention holding a rectangular cross section metal bar with a v-groove wheel running along an edge of the bar.

FIG. 3 shows a pair of brackets 1 of the invention mounted on a fixed position CNC router table 34 via bolts 40 for use with router 33 on the CNC router table. The router 33 has v-groove wheel 32 for guiding the router 33 on table 34. The v-wheel moves by running the v-wheel along edge 31 of bar 30 (e.g. extruded aluminum bar). The bar 30 is held firmly on table 34 by each end 36 and 37 by each of the brackets 1 wherein the bar 30 is held in place in groove 6 by grabbing short side 7 of bar 30 and held by screws 7 in brackets 1. Clearly any linear tracking device using a v-wheel or utilizing the bracket and bar held in the bracket is contemplated within the invention.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A linear tracking device having a v-track linear guide the v-track linear guide comprising:
    a) a rectangular cross section bar;
    b) one or more brackets adapted for use in a v-track linear guide utilizing a v-shaped rolling element, the bracket adapted to hold a length of a rectangular cross section metal bar in a manner that at least one edge is free, such that the v-shaped rolling element can run along the entire length of the at least one edge of the rectangular cross section metal bar as a v-track linear guide; and
    c) a v-shaped rolling element for running along the edge of the V-track linear guide.

2. The linear tracking device according to claim 1 wherein the rectangular cross section bar is made of extruded aluminum or steel.

3. The linear tracking device according to claim 1 wherein the v-shaped rolling element is a V-wheel for running along the edge of the V-track linear guide.

4. The linear tracking device according to claim 1 wherein the linear tracking device is a CNC device.

5. The linear tracking device according to claim 1 wherein the bracket holds the bar in a rectangular groove.

6. A bracket adapted for use in a v-track linear guide utilizing a v-shaped rolling element the bracket adapted to hold a length of a rectangular cross section metal bar in a manner that at least one edge is free such that the v-shaped rolling element can run along the entire length of the at least one edge of the rectangular cross section metal bar as a v-track linear guide.

* * * * *